Patented Aug. 29, 1933

1,924,979

UNITED STATES PATENT OFFICE 1,924,979

ACETYLENE POLYMERS AND PROCESS OF MAKING SAME

William S. Calcott, Penns Grove, and Frederick B. Downing, Carneys Point, N. J., assignors to E. I. du Pont de Nemours & Company, Wilmington, Del., a corporation of Delaware No Drawing. Application June 26, 1928
Serial No. 288,528

19 Claims. (Cl. 260—2)

This invention relates to a process of inhibiting the formation of explosive compounds from the products obtained by passing acetylene over a catalyst, as cuprous ammonium chloride. More particularly, it relates to a process of inhibiting the absorption of oxygen by such products.

It has been shown in previous applications that by passing acetylene into a mixture of ammonium chloride, water, cuprous chloride and copper powder, unsaturated hydrocarbons of higher molecular weight are formed and may be separated by distilling them from the catalyst mixture. The water driven over during the distillation process is returned to the catalyst mixture which is then ready for retreatment with acetylene. The major product is a low boiling (80–85° C.) highly unsaturated oil, called divinylacetylene and having most probably the empirical formula $C_6H_6$, but there is also produced at the same time a substantial quantity of other polymerizable polymers of acetylene. Among these may be mentioned a polymer having most probably the empirical formula $C_8H_8$ and, therefore, a tetramer of acetylene, and a polymer having the formula $C_4H_4$ and identified as monovinylacetylene.

These products will absorb oxygen from the air and slowly successively polymerize first to a viscous liquid, then to a gelatinous mass and finally to resinous derivatives. It has been shown in previous applications that such polymerization may be accelerated by heating in the presence of air. The final resinous products, whether resulting from the slow or accelerated polymerization, are often so sensitive to shock that explosion or ignition of the material may be induced by merely scratching the particles. On occasion, decomposition or explosion will occur spontaneously thus making the handling of such products a hazardous undertaking.

A method of inhibiting the formation of such explosive compounds has now been discovered. Although in the subsequent description this method is described with particular reference to the polymerization of divinylacetylene, as the major product of the initial acetylene polymerization, it is to be understood that the statements apply alike to the polymerization of the other polymerizable acetylene polymers obtained as described above, including the tetramer of acetylene, and to the polymerization of the mixed product obtained initially from the acetylene. The formulas of these various polymers are not definitely known but they contain at least one double bond together with the triple bond.

It has been discovered that if the divinylacetylene is maintained under non-oxidizing conditions during the course of the polymerization, as, for example, in an inert atmosphere or, better, in the presence of an antioxidant of the type commonly employed to prevent the deterioration of rubber, products are formed which are relatively free from oxygen derivatives and that the hazards of handling the products are greatly reduced.

It has also been found that the rate of polymerization is reduced under non-oxidizing conditions and rendered more readily reproduceable so that the control of the reaction for the production of definite polymer modifications is greatly facilitated. This discovery applies alike to the slow polymerization which takes place under conditions of storage and to the accelerated polymerization. Divinylacetylene which, in contact with the air, would deteriorate in the course of a week to a gelatinous mass, contaminated with explosive resin, will upon the addition of 0.1% hydroquinone remain a clear mobile liquid free from resin for periods in excess of a month. This fact is of great importance in the handling, storage and use of divinylacetylene and its polymers.

Any compound which is effective in preventing or greatly retarding the absorption of oxygen by divinylacetylene and its polymers is valuable in decreasing the dangers of fire and spontaneous decomposition in handling the divinylacetylene and its polymerization products. A large number of compounds have been found to be adapted for this purpose. Among them may be mentioned the phenols. For the purposes of this invention, a phenol may be defined as a compound of carbon, hydrogen, and oxygen, containing one or more hydroxyl groups attached to a ring carbon atom or atoms, and with all oxygen present in the form of these hydroxyl groups. The general formula is $R-(OH)n$, where R represents an aryl radical (an aromatic hydrocarbon residue) and $n$ may be one or more than one. As examples of phenols which have been found to exhibit such properties, when added to the above described polymers, acetylene in concentrations from .1% to 5% by weight, may be mentioned the monohydric phenols, as phenol itself, o-cresol, m-cresol, p-cresol, eugenol, thymol, beta-naphthol, guaiacol.

Also polyhydric phenols may be employed as oxidation inhibitors when employed with divinylacetylene and its related polymers. Among the polyhydric phenols which are adapted for such use may be mentioned: hydroquinone, pyrogallol, resorcinol, di-hydroxy-naphthalene, and catechol.

In general, when a phenol is added to the divinylacetylene solution, the divinylacetylene assumes a light yellow color.

Also, it has been found that the amines prevent or markedly retard the absorption of oxygen when relatively small amounts of amines are added to divinylacetylene or similar acetylene polymers. An amine, for the purposes of this invention, may be defined as a compound of carbon, hydrogen, and nitrogen, which may be straight or branched chain, homocyclic, or heterocyclic, or a combination of these, in which the nitrogen atom possesses basic properties. The general formula would be

in which R, R' and R'' may be either hydrogen or hydrocarbon groups, and in which R and R', for instance, may be further combined with each other to form a ring, giving the heterocyclic amino bodies, as pyridine and quinoline. The amines are particularly valuable in that they are volatile compounds and retard the absorption of oxygen by the divinylacetylene in the vapor phase. Also, they prevent, by reason of their volatility, the formation of oxidation products on the walls of the container above the surface of the liquid.

Among the amines which have been found to be effective are the secondary aliphatic amines, such as di-ethylamine, di-propylamine, and di-butylamine. Aromatic secondary amines, such as mono-ethyl-aniline and mono-methylaniline are also effective in retarding the absorption of oxygen.

Primary amines and tertiary amines have likewise been found to be effective and the following may be mentioned as typical examples: ethylamine, propylamine, aniline, isoamylamine, allylamine, tri-propylamine, tri-ethylamine, di-ethylaniline, di-methylaniline, orthotoluidine, paratoluidine and alphanaphthylamine.

It has also been found that the antioxidants which are effective for increasing the resistance of rubber to oxidation represent a class of compounds which are extraordinarily effective to inhibit or retard the absorption of oxygen by divinylacetylene and its polymers. Such compounds as hydroquinone, phenylalphanaphthylamine, the acid condensation product of acetaldehyde and aniline, m-toluylene diamine, and p-amino phenol and dimolecular ethylidene aniline are examples of this class.

We have further found that the polymerization of divinylacetylene under non-oxidizing conditions or in the presence of an antioxidant for divinylacetylene, results in the production of a higher percentage of soluble reaction products than is produced by polymerization under conditions where absorption of oxygen is allowed to take place. For example, when an antioxidant such as hydroquinone (0.2 to 0.5% by weight) is added to divinylacetylene and the mixture heated with or without exclusion of air for 12-14 hours at 84-88° C. under a reflux condenser, approximately 28-30% of the material polymerizes, yielding 20-22% of a viscous polymer soluble in alcohol and 8-10% of a viscous polymer soluble in acetone. While if divinylacetylene is heated under reflux at 84-88° C. in the absence of such antioxidants and in the presence of air, polymerization occurs at a more rapid rate (but one difficult to forecast) and the products when 25% of the divinylacetylene has reacted will contain modifications insoluble in acetone in amounts up to 25-30% as compared to little or no insoluble polymers at this stage of the reaction by the process of polymerization herein disclosed.

The following examples are furnished by way of illustration of the process constituting the present invention. The quantities and conditions therein set forth are of course susceptible of wide variation.

*Example 1*

Redistil 300 cc. of divinylacetylene under reduced pressure in an atmosphere of nitrogen, then heat the distillate under reflux in an atmosphere of nitrogen to 84-87° C. for 12 hours. It is advisable to mechanically agitate the mixture during polymerization to retard the precipitation of polymer on the walls of the container or the formation of a gel in the flask. After distilling off the unreacted divinylacetylene on a water bath under reduced pressure, the residue comprises a viscous oily-like product which is a mixture of the polymer modifications previously described and which may be utilized directly or the polymers separated by suitable extraction processes.

*Example 2*

Add 0.2% by weight of hydroquinone to 300 cc. of divinylacetylene and heat the mixture under reflux with or without exclusion of air at 84-87° C. for 12-14 hours. It is advisable, as in example 1, to mechanically agitate the mixture. Polymerization to the extent of 28-30% takes place and the products may be treated as in Example 1.

*Example 3*

Two samples of divinylacetylene were allowed to stand in air in a system such that the amount of oxygen absorbed could be measured. At the end of 24 hours a sample containing no amine had absorbed a volume of oxygen equal to over fifty times the volume of the liquid divinylacetylene used. A sample containing 1% of diethylamine had absorbed less than one hundredth as much as the unstabilized sample.

*Example 4*

Two samples of a mixture of divinylacetylene and tetramer ($C_8H_8$) exposed to oxygen for 24 hours, one containing no stabilizer and one containing 1% of amylamine. The stabilized sample showed less than one fiftieth the absorption of oxygen shown by the unstabilized sample.

*Example 5*

A sample of divinylacetylene containing 1% of catechol when exposed to oxygen remained a clear mobile liquid free from resinous or jelly-like bodies for a period in excess of three months.

During this period no crusts of the explosive oxidation derivatives formed on the walls of the container.

The compounds which inhibit the oxidation of the unsaturated hydrocarbons described hereinabove may be employed in varying amounts depending somewhat upon the particular substance employed. Amounts of hydroquinone as small as 0.1% based on the weight of the divinylacetylene have been successfully employed.

By the use of such substances the polymerization of the products obtainable by passing acetylene into a mixture of ammonium chloride, water and cuprous chloride is not only slowed up but the resulting products are less dangerous to handle. Moreover, when antioxidants are employed a higher yield of polymerization products is obtainable.

We claim:

1. The process of inhibiting the formation of explosive compounds from polymerizable polymers of acetylene which comprises maintaining said compounds under conditions adapted to retard oxidation.

2. The process of polymerizing unsaturated hydrocarbons obtainable by passing acetylene into a mixture of ammonium chloride, water and cuprous chloride which comprises carrying out the polymerization under non-oxidizing conditions.

3. The process of polymerizing divinylacetylene which comprises carrying out the polymerization under non-oxidizing conditions.

4. The process of inhibiting the formation of explosive compounds during the polymerization of polymerizable polymers of acetylene which comprises carrying out the polymerization of an inert atmosphere.

5. The process of inhibiting the formation of explosive compounds during the polymerization of polymerizable polymers of acetylene which comprises adding to said polymers a substance adapted to retard their oxidation.

6. The process of inhibiting the formation of explosive compounds during the polymerization of polymerizable polymers of acetylene which comprises adding to said polymers an antioxidant of the group consisting of phenols, amines and rubber antioxidants.

7. The process of inhibiting the formation of explosive compounds during the polymerization of polymerizable polymers of acetylene which comprises adding to said polymers an antioxidant of the group consisting of polyhydric phenols, aromatic amines and rubber antioxidants.

8. The process of inhibiting the formation of explosive compounds during the polymerization of polymerizable polymers of acetylene which comprises adding to said polymers a substance of the class adapted to inhibit the oxidation of rubber.

9. The process of polymerizing unsaturated hydrocarbons obtainable by passing acetylene into a mixture of ammonium chloride, water and cuprous chloride which comprises carrying out the polymerization in the presence of a rubber antioxidant of the group consisting of hydroquinone, phenyl-alpha-naphthylamine, the acid condensation product of acetaldehyde and aniline, m-toluylene-diamine, p-amino-phenol and dimolecular ethylidene aniline.

10. The process of inhibiting the formation of explosive compounds during the polymerization of a polymerizable polymer of acetylene which comprises adding hydroquinone to said polymer in an amount not less than 0.1% of the amount of polymer.

11. The process of polymerizing a polymerizable acetylene polymer which comprises carrying out the polymerization in an inert atmosphere in the presence of a substance of the class adapted to inhibit oxidation of said polymer.

12. The process of polymerizing unsaturated hydrocarbons obtainable by passing acetylene into a mixture of ammonium chloride, water and cuprous chloride which comprises carrying out the polymerization with heat under non-oxidizing conditions and subsequently removing volatile constituents by distilling in vacuo.

13. The process of polymerizing unsaturated hydrocarbons obtainable by passing acetylene into a mixture of ammonium chloride, water and cuprous chloride which comprises carrying out the polymerization with heat in the presence of hydroquinone and subsequently removing volatile constituents by distilling in vacuo.

14. A composition comprising a non-benzenoid polymer of acetylene together with an antioxidant of the group consisting of phenols, amines and rubber antioxidants.

15. A composition comprising a non-benzenoid polymer of acetylene together with a substance adapted to inhibit the oxidation of said polymer.

16. A composition comprising a polymer of acetylene that contains a triple bond and at least one double bond together with a polyhydric phenol.

17. A composition comprising a polymer of acetylene that contains a triple bond together with hydroquinone.

18. A composition comprising a non-volatile non-benzenoid polymer of acetylene together with a substance adapted to retard the oxidation of said polymer.

19. A non-benzenoid polymer of acetylene obtained by polymerizing a polymerizable polymer of acetylene under non-oxidizing conditions.

WILLIAM S. CALCOTT.
FREDERICK B. DOWNING.

CERTIFICATE OF CORRECTION.

Patent No. 1,924,979.                                                           August 29, 1933.

WILLIAM S. CALCOTT, ET AL.

It is hereby certified that error appears in the printed specification of the above numbered patent requiring correction as follows: Page 1, line 101, after "polymers" strike out the comma and insert the word "of"; page 3, line 23, claim 4, for "of" read "in"; and that the said Letters Patent should be read with these corrections therein that the same may conform to the record of the case in the Patent Office.

Signed and sealed this 24th day of October, A. D. 1933.

(Seal)                                                        F. M. Hopkins
                                                              Acting Commissioner of Patents.